(12) United States Patent
Vespasien et al.

(10) Patent No.: US 9,829,095 B2
(45) Date of Patent: Nov. 28, 2017

(54) METHOD FOR CONTROLLING STATIONARY CLUTCHING OF A GEARBOX

(71) Applicant: RENAULT S.A.S., Boulogne-Billancourt (FR)

(72) Inventors: Jean-Marie Vespasien, Choisy-le-Roi (FR); Vivien Lalleron, Juvisy-sur-Orge (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 109 days.

(21) Appl. No.: 14/782,248

(22) PCT Filed: Mar. 13, 2014

(86) PCT No.: PCT/FR2014/050572
§ 371 (c)(1),
(2) Date: Oct. 2, 2015

(87) PCT Pub. No.: WO2014/162077
PCT Pub. Date: Oct. 9, 2014

(65) Prior Publication Data
US 2016/0040779 A1    Feb. 11, 2016

(30) Foreign Application Priority Data

Apr. 5, 2013 (FR) ...................... 13 53082

(51) Int. Cl.
*F16H 59/04* (2006.01)
*F16H 61/04* (2006.01)

(52) U.S. Cl.
CPC ... *F16H 61/0403* (2013.01); *F16H 2061/047* (2013.01); *F16H 2061/0422* (2013.01)

(58) Field of Classification Search
CPC .................. F16H 61/0403; F16H 2061/0407
(Continued)

(56) References Cited

U.S. PATENT DOCUMENTS 5,701,574 A * 12/1997 Derflinger ................. B22F 5/08
                                                          419/26
6,729,458 B2 * 5/2004 Blechschmidt ......... F16D 23/06
                                                          192/108
(Continued)

FOREIGN PATENT DOCUMENTS

DE        195 30 233 A1     2/1997
FR        2 912 484 A1      8/2008
WO        2012/131259 A1   10/2012

OTHER PUBLICATIONS

International Search Report issued May 21, 2014 for PCT/FR2014/050572 filed on Mar. 13, 2014.
(Continued)

*Primary Examiner* — Ha D Ho
(74) *Attorney, Agent, or Firm* — Oblon, McClelland, Maier & Neustadt, L.L.P.

(57) ABSTRACT

A method for controlling the stationary clutching of an idler gear on a secondary shaft of a parallel shaft gearbox, by movement of a sliding gear constrained to rotate with said shaft towards the idler gear without the intervention of mechanical synchronization members, characterized in that it involves:—activating the translational movement of the sliding gear towards the idler gear without previous synchronization, if the two parts are unable to rotate when clutching is requested, and—activating a rotation of the idler gear following the free flight travel of the sliding gear to position the teeth of one in place of the holes of the other, if the clutch engagement threshold has not been crossed following a time delay.

4 Claims, 2 Drawing Sheets

(58) Field of Classification Search
USPC ............................................................ 74/335
See application file for complete search history.

(56) References Cited

U.S. PATENT DOCUMENTS

| | | | | |
|---|---|---|---|---|
| 6,966,805 B1 * | 11/2005 | Caldwell | ................ | B63H 23/06 |
| | | | | 440/75 |
| 8,187,144 B2 * | 5/2012 | Kadota | ................ | B60W 10/02 |
| | | | | 477/176 |
| 8,235,853 B2 * | 8/2012 | Lutoslawski | .......... | B60K 6/365 |
| | | | | 475/5 |
| 2007/0225113 A1 | 9/2007 | Ogata | | |
| 2008/0314176 A1 | 12/2008 | Krieger et al. | | |

OTHER PUBLICATIONS

French Search Report issued on Jan. 8, 2014 for FR 1353082 filed on Apr. 5, 2013.

\* cited by examiner

METHOD FOR CONTROLLING STATIONARY CLUTCHING OF A GEARBOX

The present invention relates to the field of controlling gear changes in parallel shaft gearboxes, without means of mechanical synchronization.

More specifically, the invention has as its object a method for controlling the stationary dog engagement of an idler gear on a secondary shaft of a parallel shaft gearbox by movement of a sliding gear constrained to rotate with said shaft toward the idler gear without the intervention of mechanical synchronization members.

This invention finds a non-limitative application in a hybrid transmission for an automotive vehicle equipped with a heat engine and with an electric drive machine, including two concentric primary shafts, each carrying at least one step-down gear on a secondary shaft connected to the wheels of the vehicle and a first coupling means between two primary shafts capable of occupying three positions, in which the heat engine is decoupled from the drive train connecting the electric machine to the wheels, or it drives the wheels with or without the assistance of the electric machine, or it is coupled to the electric machine in order to add their torques together.

BACKGROUND

FIG. 1 describes a non-limitative example of a hybrid transmission derived from this design principle. Said transmission, which is illustrated by publication WO2012/131259, includes a solid primary shaft 1 connected directly by means of a filtration system (shock-absorbing hub, "damper", a dual mass flywheel or some other means) 2, to the flywheel 3 of a heat engine (not illustrated here). The solid shaft 1 carries an idler gear 4 capable of being connected to the latter by a first coupling system 5 (dog clutch, synchronizer, or some other type of coupling, progressive or otherwise). A hollow primary shaft 6 is connected to the rotor of an electric machine 7. The hollow shaft 6 carries two fixed gears 8, 9. It may be connected to the solid primary shaft 1 by means of the first coupling system 5. A secondary shaft 10 carries two idler gears 11 and 12. The idler gears 11 and 12 may be connected to the primary shaft by means of a second coupling system 13 (dog clutch, synchronizer, or some other type of coupling, progressive or otherwise). The secondary shaft 10 likewise carries a fixed gear 14 and a step-down gear 15, leading to a differential 16 connected to the wheels of the vehicle.

As indicated above, the first coupling means 5 may occupy at least three positions, in which:
- the heat engine is decoupled from the drive train connecting the electric machine 7 to the wheels (sliding gear in the center), the transmission being in neutral mode or electric mode,
- the heat engine drives the wheels with or without the assistance of the electric machine (sliding gear on the left), the transmission being in heat mode or hybrid mode, and
- the heat engine and the electric machine 7 are coupled in such a way (sliding gear on the right) as to add their respective torques together, in the direction of the wheels, the transmission being in hybrid mode, or in a "roadside recharging" mode, in which the heat engine does not drive the wheels, but causes the electric machine to rotate as a generator in order to recharge the batteries of the vehicle.

When a gearbox does not include means of mechanical synchronization between the idler gears and a secondary gearbox shaft, on which they require to be engaged and disengaged, the synchronization necessary for engagement and disengagement may be assured by controlling the speed of the primary shaft in order to "synchronize" it with the secondary shaft, close to the gear ratio. This control is performed by adjusting the torque supplied by the one or more drive sources driving the primary line of the gearbox. In the case of a hybrid transmission, such as that described below, these drive sources are the heat engine, the electric machine, or both of these, in a hybrid operating mode in which the two concentric primary shafts are rotationally associated (sliding gear on the right).

When the vehicle is in motion, the secondary shaft rotates in all the operating modes of the transmission (heat engine, hybrid, electric). The idler gear to be engaged on the new ratio rotates at a different speed from the secondary shaft. Synchronization of the idler gear on its shaft is essential. When the vehicle is stationary, the secondary gears may also be at rest. In this case, the sliding gear may be displaced in order to engage the idler gear without synchronization.

However, the vehicle may also be brought to a stop without the need for the secondary gears to be stationary. This is particularly true in the roadside charging mode for this transmission, where, if the vehicle moves off after the request to change gear. The teeth of the sliding gear then run the risk of coming into contact with that of the idler gear. When the vehicle is stationary, this crashing of the gears will be an unpleasant experience for the driver.

BRIEF SUMMARY

The present invention is intended to ensure smooth dog engagement of the sliding gear on the idler gear when stationary, by eliminating the risk of crashing the gears.

To this end, it proposes activating the translational movement of the sliding gear toward the idler gear without pre-synchronization, if the two parts are unable to rotate at the time when dog engagement is requested, and
- activating a rotation of the idler gear following the free flight travel of the sliding gear in order to position the teeth of one in place of the holes of the other, if the dog clutch engagement threshold has not been crossed following a time delay.

BRIEF DESCRIPTION OF THE DRAWINGS

The present invention will be better understood from a perusal of the following description of a non-limitative mode of implementation thereof, with reference to the accompanying drawings, in which.

DETAILED DESCRIPTION

Figure 1:
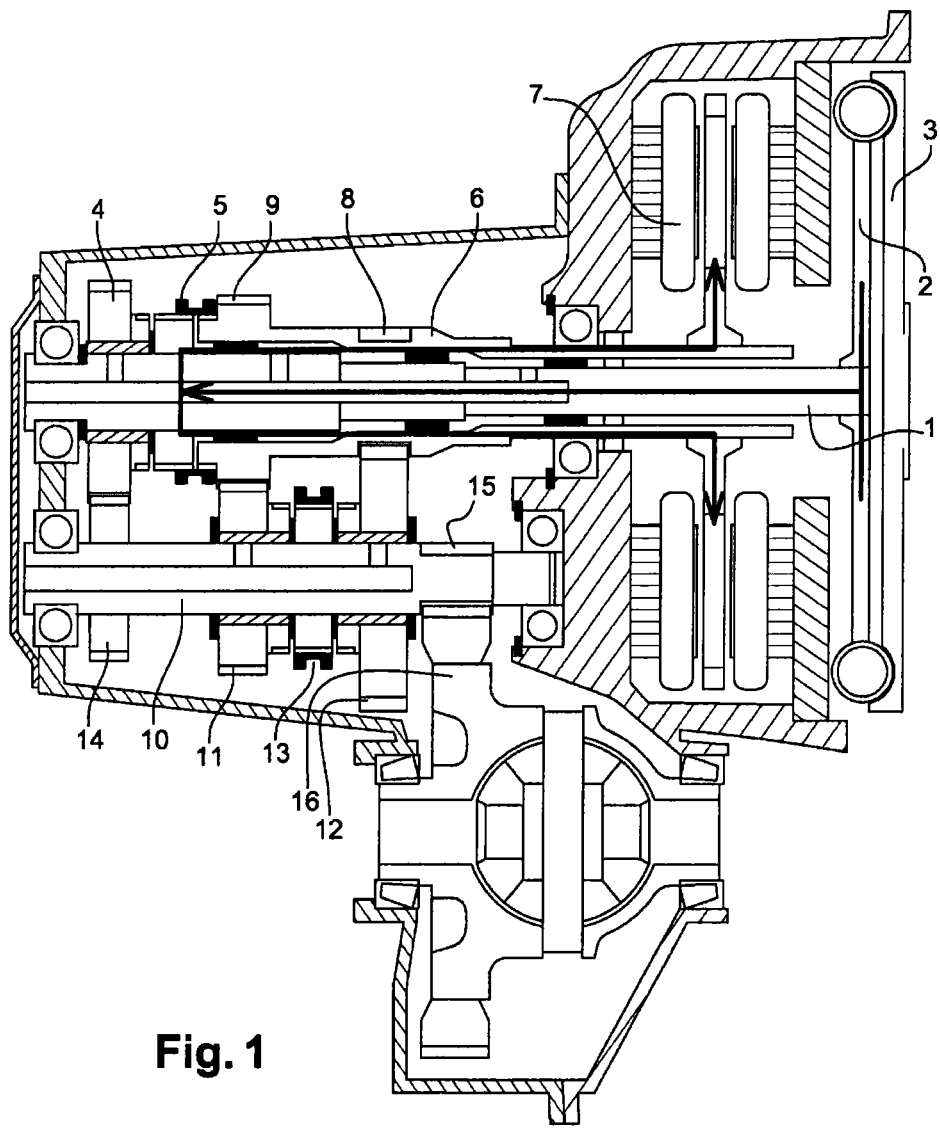
FIG. 1 represents a hybrid transmission in roadside charging mode.

In the gearbox in FIG. 1:
- the dog clutch of the secondary coupler 13 is integral with the secondary shaft 10,
- the dog clutch of the primary coupler 5 is integral with the solid primary shaft 1,
- the speed of rotation of the idler gears 11 and 12 is determined by the speed of rotation of the rotor of the electric machine, or of the hollow primary shaft 6.

If a request for dog engagement is transmitted while one (at least) of the two parts to be coupled is rotating, the realization of dog engagement will pass through two successive phases synchronization of the speeds, followed by the translational movement of the dog clutch. The two parts to be coupled (dog clutch and destination idler gear) accordingly require to be synchronized before activating the translational movement of the dog clutch.

In the roadside recharging situation illustrated by the figure, the first coupling system is in position 3. This associates the solid primary shaft 1 and the hollow primary shaft 6 in rotation. The second coupling system 13 is open. As a result, the transmission is in the "neutral position". The heat engine as it rotates is able to drive the electric machine, which then operates as a generator, in order to recharge the batteries (not illustrated here) of the vehicle. If the rotor of the electric machine is turning, it will drive the idler gears 11, 12 by means of the hollow primary shaft 6. Furthermore, when the vehicle is in motion, the secondary shaft 10 will rotate because is being driven by the wheels.

Figure 2:
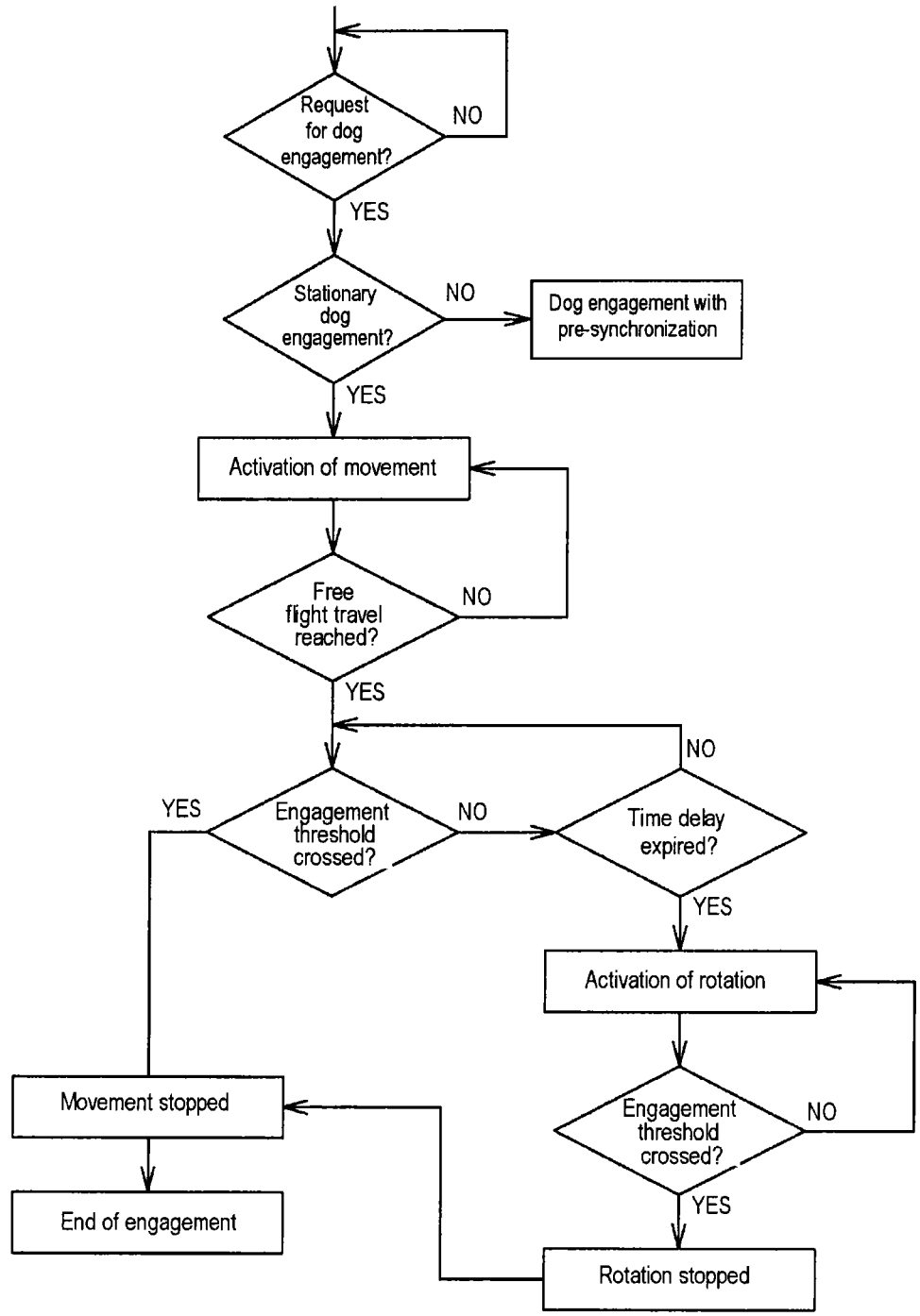
FIG. 2 illustrates the proposed strategy.

The method depicted in FIG. 2 makes it possible to control the stationary dog engagement of an idler gear on a secondary shaft of a parallel shaft gearbox, by the translational movement of a sliding gear constrained to rotate with said shaft, toward the idler gear, without the intervention of mechanical synchronization members. According to this method, the request for dog engagement is followed by a verification of the status of the rotating parts: if one of the parts (sliding gear and/or idler gear) is rotating, they will be synchronized before dog engagement (dog engagement with "pre-synchronization"). If not, the situation of "stationary dog engagement" is identified. The translational movement of the dog clutch is activated, and it continues for the "free flight" travel of the dog clutch. If the teeth come into contact following the free flight travel, the engagement threshold cannot be crossed without offsetting the teeth: the rotation of the idler gear (with the electric machine) is activated, following a time delay, in order to offset the teeth in a relative position permitting their engagement, that is to say positioning the teeth of one opposite the holes of the other. The rotation is brought to a stop once the engagement threshold has been crossed.

In summary, the translational movement of the sliding gear toward the idler gear is activated without pre-synchronization, if the two parts are stationary at the time when dog engagement is requested, and a rotation of the idler gear is activated following the free flight travel of the sliding gear in order to position the teeth of one in place of the holes of the other if the dog clutch engagement threshold has not been crossed following a time delay. On the other hand, the idler gear is synchronized with the sliding gear before causing it to move in translation if one of the two parts is rotating at the time when dog engagement is requested.

One of the main advantages of the method is to enable direct dog engagement, that is to say without the need to cause the idler gear to rotate. Situations can arise, however, in which the idler gear and the sliding gear are in a position such that the teeth of one are opposite the holes of the other. Dog engagement lends itself ideally in this case to engaging the drive without the slightest jerking.

In other situations, the method proposes the translational movement of the sliding gear until it comes into abutment tooth against tooth, following its free flight travel. The coming into abutment of the sliding gear is detected by the fact that it is unable to continue beyond its free flight travel in order to reach its threshold of engagement.

When the teeth of the sliding gear come into abutment with those of the idler gear, a torque setpoint is transmitted to an electric machine for driving the idler gear, such that the electric machine 7 which drives a primary shaft of the gearbox rotationally associated with the idler gear (hollow primary shaft 6). The idler gear is thus caused to rotate, while continuing to drive the sliding gear. In this way, engagement takes place as soon as a window of opportunity presents itself.

This novel approach permits dog engagement to take place, without experiencing any crashing of the gears, when the vehicle is stationary. The achieved object is to optimize the quality of engagement to the extent that it is rendered imperceptible to the driver.

The invention claimed is:

1. A method for controlling a stationary dog engagement of an idler gear on a secondary shaft of a parallel shaft gearbox, by movement of a sliding gear constrained to rotate with said shaft toward the idler gear without the intervention of mechanical synchronization members, the method comprising:
    synchronizing the idler gear with the sliding gear before causing the sliding gear to move, if one of the idler gear and the sliding gear is rotating at the time when dog engagement is requested,
    activating the translational movement of the sliding gear toward the idler gear without pre-synchronization, if the idler gear and the sliding gear are unable to rotate at the time when dog engagement is requested, and
    activating a rotation of the idler gear following a free flight travel of the sliding gear in order to position teeth of the idler gear in place of holes of the sliding gear or to position teeth of the sliding gear in place of holes of the idler gear, if a dog clutch engagement threshold has not been crossed following a time delay.

2. The method for controlling as claimed in claim 1, wherein a torque setpoint is transmitted to a drive unit for the idler gear, when the teeth of the sliding gear come into abutment against the teeth of the idler gear, in such a way as to cause the rotation of the idler gear, while continuing to drive the sliding gear.

3. The method for controlling as claimed in claim 2, wherein the coming into abutment of the sliding gear is detected by the fact that the sliding gear is unable to continue beyond the free flight travel in order to reach the dog clutch engagement threshold.

4. The method for controlling as claimed in claim 2, wherein the torque setpoint is transmitted to an electric machine driving a primary shaft of the gearbox, which is rotationally associated with the idler gear.

\* \* \* \* \*